United States Patent Office 2,759,894
Patented Aug. 21, 1956

2,759,894

RUST INHIBITOR

Alfred Henry Matuszak, Westfield, N. J., assignor to Esso Research and Engineering Company, a corporation of Delaware No Drawing. Application July 27, 1951,
Serial No. 239,011

1 Claim. (Cl. 252—51.5)

This invention relates to rust preventing oil compositions and more particularly to mineral lubricating oil compositions which tend to inhibit rusting and corrosion of metal parts which are exposed to moisture.

A primary object of the present invention is the preparation of compositions which may be employed as internal combustion engine lubricants and which will serve also for the protection of exposed surfaces of such engines when the same are not in use. When operating such engines in climates having a high humidity, rusting begins within a very short period of time after the engine is shut down. The compositions of the present invention are particularly valuable in preventing such rusting and they are valuable not only in the lubrication of internal combustion engines, but with oil bases of suitable viscosity they may be employed as turbine oils or as lubricants for fire arms, ordnance equipment, industrial machinery, etc., and in fact for any lubricating purposes where metal surfaces are exposed to humid air.

The rust inhibiting compound which is added to a hydrocarbon oil product in accordance with the present invention is a product derived by reacting an amino alcohol of the type hereinafter defined, with an organic acid reacting compound of the type of aliphatic and cycloaliphatic carboxylic acids and their corresponding anhydrides and acid halides, at a temperature sufficient to cause evolution of water and/or hydrogen halide. The products of the latter are particularly efficacious for the purposes of the present invention. Three main reactions are possible, and these may be represented by the following typical equations:

(1)
$(HOCH_2)_3CNH_2 + RCOOH$ (or $RCOCl$) ⟶

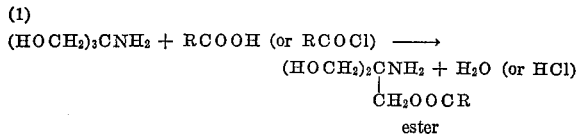
ester (2)
$(HOCH_2)_3CNH_2 + RCOOH$ (or $RCOCl$) ⟶

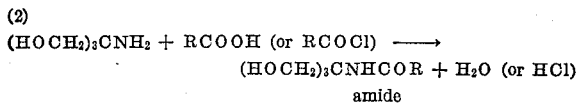
amide (3)
$(HOCH_2)_3CNH_2 + RCOOH$ (or $RCOCl$) ⟶

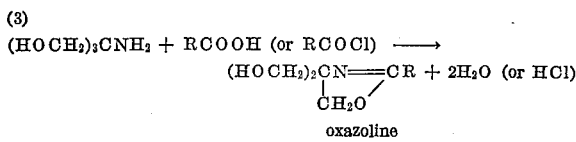
oxazoline

In addition, secondary products may be formed by a combination of two of these reactions as shown in the following equations:

(4)
$(HOCH_2)_3CNH_2 + 2RCOOH$ (or $2RCOCl$) ⟶

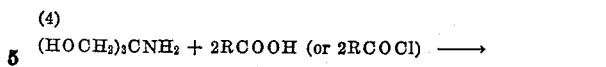
ester-amide (5)
$(HOCH_2)_3CNH_2 + 2RCOOH$ ⟶

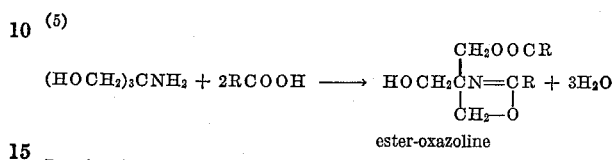
ester-oxazoline

In the latter case, substitution of the acid halide gives a slightly different result. However, it is unlikely that the compounds represented by 4 and 5 are formed except in cases where the mol ratio of acid to amino alcohol is greater than 1:1. The product formed by the removal of two molecules of water per molecule of amino alcohol, i. e., the oxazoline type, is generally preferred.

The preparation of reaction products per se of the acids with the amines, of the general type and general conditions specified above is described in the Orelup Patent 2,388,281, wherein the products are referred to as esters. Since, however, in some of the examples described in the patent the amount of water produced in the reaction is substantially greater than that which would be produced in a simple esterification reaction, it is believed that a large proportion of the product consists of an oxazoline which is formed in accordance with Equation 3 above. It is probable that the reaction products of the present invention consist mainly of mixtures of esters, amides, and oxazolines, and that in the case of products formed by the elimination of two molecules of water the oxazoline is the predominating component of the product.

Useful products for the purposes of the present invention may also be formed by reacting two molecular proportions of the acid halide with one molecular proportion of amino alcohol, in which case the additional acid will replace a free hydroxyl group of the oxazoline or any other reaction product with an additional ester group as shown above in Equations 4 and 5. For the purposes of the present invention, however, it is desirable to have at least one free hydroxyl group in each molecule of the final product, and, accordingly, the relative amounts of acid halide and amino alcohol which are reacted and the amount of hydrogen halide product which is removed in the reaction will be adjusted so that not all of the hydroxyl groups of the amino alcohol will be reacted.

For accomplishing the removal of the desired quantity of water, when acid is used, a temperature at least as high as 140° C. is ordinarily required, and temperatures of 160° C. to 190° C. are generally preferred. The reaction is generally carried out, in the case of a reaction with an acid, in a reaction flask attached to a reflux condenser and water separator and the reaction continued until no more water distills over, the time required usually being from two to four hours. A solvent such as toluene is generally employed to facilitate the removal of the water azeotropically. When an acid halide is employed in the reaction, it is desirable to have present a basic compound, e. g., pyridine, which is inert to the acid halide, to react with the evolved hydrogen halide.

The amino alcohols or hydroxyaliphatic amines which are employed in the preparation of rust preventing additives in accordance with the present invention may be defined by the formula

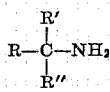

where at least two of the radicals R, R', and R'' are radicals of the structure

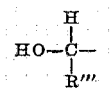

where R''' is hydrogen or an aliphatic hydrocarbon radical containing 1 to 12 carbon atoms, and the latter may have attached one or more hydroxyl groups, and where the remaining radical is hydrogen or an aliphatic hydrocarbon radical containing 1 to 8 carbon atoms, and the latter may also have attached one or more hydroxyl groups. The groups R, R', R'' and R''' may be alike or different and may consist of straight or branched chain radicals and may be saturated or unsaturated. Preferred compounds are those in which at least two of the radicals R, R', and R'' are radicals of the structure

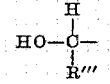

in which R''' is hydrogen or a methyl group and any remaining radical is a methyl group.

The above defined amino alcohols are reacted with aliphatic or cycloaliphatic acid halides (preferably the acid chlorides) containing 6 to 24 carbon atoms per molecule. Such acid reacting compounds may contain straight or branched chains and may be saturated or unsaturated and may contain one, two, or more acid reacting groups per molecule.

Particularly suitable acidic materials which may be employed in the formation of the additives of the present invention are the acid halides of lauric, palmitic, stearic, oleic, linoleic, ricinoleic, eleomargic, erucic, behenic, arachidic, lignoceric, and other fatty acids, also of the naphthenic acids, as well as the halides of the carboxylic acids derived by the oxidation of petroleum products or by the oxidation of "Oxo" products produced by the reaction of carbon monoxide and hydrogen upon an olefin. The acid halides of naturally occurring products such as tall oil, castor oil, soybean oil, linseed oil, olive oil, tung oil, rapeseed oil, menhaden oil and the like, may conveniently be employed.

The amino alcohols or hydroxyaliphatic amines employed in the preparation of the additives of the present invention may be conveniently prepared by first reacting a nitroparaffin with an aldehyde in the presence of an alkali catalyst to form a nitro alcohol, and then reducing the nitro alcohol to the corresponding amino alcohol or hydroxyaliphatic amine. The composition of the nitroalcohol obtained in the first reaction will be dependent on the temperature and the mol ratio of the reactants employed. For this reaction it is necessary to employ a nitroparaffin having a hydrogen atom attached to the carbon atom which is adjacent to the nitro group. In the reaction with the aldehyde this hydrogen atom is replaced by a hydroxyaliphatic group. When an aldehyde is employed which has one or more hydroxyl groups attached to the hydrocarbon chain, such hydroxyl groups remain as additional hydroxyl groups in the nitro alcohol which is formed and in the amine which is formed by reduction of the latter. Such hydroxyaldehydes may be formed by aldehyde condensation reactions.

Some of the more preferred examples of products which are useful as additives in accordance with the present invention are the reaction products of oleyl chloride with monomethylol dimethyl amino methane, dimethylol methyl amino methane, and trimethylol amino methane. They have good oil solubility and give excellent protection against rusting.

The additives of the present invention may be advantageously employed with petroleum fractions of a wide variety, although their preferred use is in lubricating oil bases to form lubricant compositions which also act as corrosion preventives. The base stocks may be derived from various types of crude petroleum and may consist of distillates or blends of various kinds which have been refined by any of the conventional methods. Synthetic oils may also be used such as those obtained by the polymerization of olefins or by the hydrogenation of coal or its products. In the case of lubricants the base stock chosen will normally be that oil which without the new additives gives the optimum performance in the service contemplated. The base oils may vary considerably in viscosity and other properties depending upon the particular use for which they are desired. For crankcase use they usually range from about 40 to 130 seconds viscosity Saybolt at 210° F. The viscosity index may range from less than 0 to 130 or even higher. Turbine oils usually have a viscosity of 40 to 60 seconds Saybolt at 210° F. Corrosion preventing compositions other than lubricating oils may comprise base stocks of a wide variety with respect to viscosity and may consist of mixtures of base stocks, as in slushing oils, which may consist of a mixture of naphtha and lubricating oil and may contain small amounts of petrolatum or a fatty compound such as degras.

For the purpose of the present invention the additives described herein are incorporated in the base stock in proportions generally ranging from 0.01% to 10% by weight. In some cases larger proportions than those specified may be employed to advantage.

The following examples illustrate the application of the present invention to a lubricant suitable for use in an airplane engine, but these examples are not to be construed as limiting the invention in any way.

EXAMPLE I 30.3 g. (0.25 mol) of tris (hydroxymethyl) amino methane (trimethylol amino methane) and 400 g. of pyridine were heated to 50–60° C. in a 1-liter flask equipped with a stirrer, thermometer, nitrogen inlet tube and reflux condenser, and 75.2 g. (0.25 mol) of oleyl chloride was added over a period of 15 minutes, an atmosphere of nitrogen being maintained in the flask. The pyridine was then removed by heating to about 80° C. under a pressure of about 160 mm. and the reaction product then dissolved in 250 g. of toluene which caused precipitation of the amine hydrochloride. After thoroughly washing the toluene solution containing the desired reaction product, the toluene was removed by distillation under reduced pressure of 20 mm. leaving a clear, dark red product.

This product was then evaluated to determine its rust inhibiting properties by employing it in concentrations of 0.5% and 1% by weight in a phenol extracted Mid-Continent lubricating oil base of 120 seconds viscosity Saybolt at 210° F. which was used as a crankcase oil in a single cylinder air cooled aviation type engine of 5.7 H. P. at 2400 R. P. M. speed, manufactured by the Wisconsin Motor Corporation. The engine was operated on 91 grade aviation gasoline containing 4 cc. tetraethyl lead per gallon. After running the engine for eight hours with this test oil, the stainless steel cylinder which has the same composition as the cylinders of a full scale airplane engine, such as a Pratt and Whitney R1340 engine, was removed and stored in a humidity cabinet in which the temperature was caused to vary between 72° and 90° F. and the relative humidity between 94% and 53% during each 24 hour period. Typical conditions in a tropical climate were thus simulated. After each day the amount of rust present on the cylinder wall was observed and the storage period continued until the test period had been completed. A similar test was conducted by employing the same base oil without a rust inhibitor as the crankcase lubricant and similarly storing the cylinder in the humidity cabinet. The observations of the conditions of the cylinder are given in the following table:

CYLINDER RUSTING TEST

[Percent of cylinder wall rusted]

|  | Days of Storage | | | | | | | | | |
|---|---|---|---|---|---|---|---|---|---|---|
|  | 1 | 2 | 3 | 4 | 5 | 6 | 7 | 8 | 9 | 10 |
| Unhibited Oil | 5 | 10 | 15 | 22 | 30 | 35 | 39 | 42 | 44 | 45 |
| Same + 0.5% Additive | 7.5 | 10 | 14 | 17 | 17 | 20 |  |  |  |  |
| Same + 1% Additive | 0 | 0.5 | 0.5 | 0.5 | 1 | 1 | 2 | 2 | 2 | 2.5 |

By comparison, the reaction products of equimolar parts of 2-methyl-2-amino-1, 3-propane diol and oleic acid showed 13% rusting after 10 days when 1% was added to the same oil. This is a considerable improvement over the uninhibited oil. The data are shown in the next example.

EXAMPLE II 52.6 g. (0.5 mol) of 2-methyl-2-amino-1,3-propanediol (dimethylol methyl amino methane) and 141.2 g. (0.5 mol) of oleic acid were refluxed in the presence of toluene at 160° C. for 4 hours in a 1-liter reaction flask equipped with stirrer, thermometer, nitrogen inlet tube, reflux condenser and water separator. About 16 cc. (0.89 mol) of water was collected. The toluene was then removed by heating at 160° C. under a pressure of 30 mm., leaving an oily amber colored liquid product.

A 1% blend of the product thus obtained in the same base oil as that employed in a test described in Example I was evaluated as to its rust inhibiting properties by employing the blend in an engine and permitting the cylinder to rust in a humidity cabinet according to the method described above in Example I. The observations of the condition of the cylinder are given in the following table:

CYLINDER RUSTING TEST

[Percent of cylinder wall rusted]

|  | Days of Storage | | | | | | | | | |
|---|---|---|---|---|---|---|---|---|---|---|
|  | 1 | 2 | 3 | 4 | 5 | 6 | 7 | 9 | 9 | 10 |
| Uninhibited Oil | 5 | 10 | 15 | 22 | 30 | 35 | 39 | 42 | 44 | 45 |
| Same + 1% Additive | 7 | 8 | 9 | 10 | 10 | 10 | 11 | 12.5 | 13 | 13 |

EXAMPLE III 30.3 g. (0.25 mol) of tris (hydroxy methyl) amino methane (trimethylol amino methane) and 141.2 g. (0.5 mol) of oleic acid were refluxed in the presence of 100 g. of toluene at 160° C. for 18 hours in apparatus similar to that described in Example II. The amount of water recovered was 18.3 cc. The toluene was removed from the reaction product by distilling off at a pressure of less than 100 mm., leaving an amber colored liquid product which on cooling became a semi-solid mass weighing 161 g., which represents a yield of 99%.

A 1% blend of this product was evaluated as to its rust inhibiting properties in the same manner as described in Example I, employing the same base oil. The observations of the condition of the cylinder are given in the following table:

CYLINDER RUSTING TEST

[Percent of cylinder wall rusted]

|  | Days of storage | | | | | | | | | |
|---|---|---|---|---|---|---|---|---|---|---|
|  | 1 | 2 | 3 | 4 | 5 | 6 | 7 | 8 | 9 | 10 |
| Uninhibited Oil | 5 | 10 | 15 | 22 | 30 | 35 | 39 | 42 | 44 | 45 |
| Same + 1% Additive | 6 | 10.5 | 12 | 12 | 13 | 13.5 | 13.5 | 13.5 | 13.5 |  |

It will be noted that the oleic acid derivative of equimolar parts was fairly good as an inhibitor, the derivative of 2 mols of oleic acid per mol of tris (hydroxy methyl) amino methane being slightly inferior. In theory, it would be expected that the reaction products of oleic acid and tris (hydroxy methyl) amino methane and of oleyl chloride with the latter would be identical. The reason for the marked superiority of the oleyl chloride product is not clear but it is believed that since the chloride is somewhat more reactive, the reaction is more complete and the product is more uniform in composition.

This application is a continuation-in-part of application Serial No. 57,619, filed October 30, 1948, now abandoned.

What is claimed is:

A composition consisting essentially of a mineral lubricating oil containing dissolved therein 0.1% to 10% of the oil soluble product formed by reacting about equal molecular proportions of oleyl chloride and trimethylol amino methane at about 50–60° C. in the presence of a sufficient amount of pyridine to absorb one molecular proportion of hydrogen chloride for each molecular proportion of oleyl chloride reactant, for a period of at least 15 minutes, and removing the pyridine and pyridine hydrochloride formed in the reaction from the reaction product.

References Cited in the file of this patent

UNITED STATES PATENTS

| 2,018,758 | Ellis | Oct. 29, 1935 |
| 2,371,333 | Johnston | Mar. 13, 1945 |
| 2,388,281 | Orelup | Nov. 6, 1945 |
| 2,403,067 | Fischer | July 2, 1946 |
| 2,470,965 | Woods et al. | May 24, 1949 |
| 2,564,422 | Barnum | Aug. 14, 1951 |

OTHER REFERENCES

"The Chemistry of the Oxazolines"; Chemical Reviews, June 1949, vol. 44, pages 447–476.